United States Patent
Johnson et al.

(10) Patent No.: US 12,244,977 B2
(45) Date of Patent: Mar. 4, 2025

(54) MONITORING POSITION AND ORIENTATION OF A PROJECTOR

(71) Applicant: Microsoft Technology Licensing, LLC., Redmond, WA (US)

(72) Inventors: Parry Byron Johnson, Redmond, WA (US); Dmitriy Churin, Redmond, WA (US); Dmitry Reshidko, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 17/584,976

(22) Filed: Jan. 26, 2022

(65) Prior Publication Data

US 2023/0239443 A1 Jul. 27, 2023

(51) Int. Cl.
*H04N 9/31* (2006.01)
(52) U.S. Cl.
CPC ......... *H04N 9/3191* (2013.01); *H04N 9/3161* (2013.01); *H04N 9/3176* (2013.01)
(58) Field of Classification Search
None
See application file for complete search history.

(56) References Cited

U.S. PATENT DOCUMENTS 10,585,477 B1 * 3/2020 Cavin .................... G06F 3/013
11,202,043 B1 * 12/2021 Elazhary ............ G02B 27/0176
2018/0322845 A1 * 11/2018 Machida ............ G02B 27/0172
2020/0018968 A1    1/2020 Edwin et al.
2020/0244938 A1    7/2020 Wu
2020/0278544 A1    9/2020 Poulad et al.

OTHER PUBLICATIONS

"International Search Report and Written Opinion Issued in PCT Application No. PCT/US22/048325", Mailed Date: Feb. 14, 2023, 11 Pages.

* cited by examiner

*Primary Examiner* — Bao-Luan Q Le
*Assistant Examiner* — Danell L Owens
(74) *Attorney, Agent, or Firm* — Workman Nydegger

(57) ABSTRACT

A projection system includes an illumination light source configured to emit an illumination light beam, a monitor light source configured to emit a monitor light beam, and a projector configured to project both the illumination light beam and the monitor light beam into a projected combined light beam. A first portion of the projected combined light beam is propagated over a first beam path in a first direction, causing an eye of a user to see a display image. A second portion of the projected combined light beam is propagated over a second beam path in a second direction, causing a monitor camera to capture a monitor image. The monitor image is analyzed to determine an orientation or a position of the monitor image. In response to determining that the monitor image is not properly oriented or positioned, an orientation or position of the projector or the illumination image is adjusted.

20 Claims, 12 Drawing Sheets

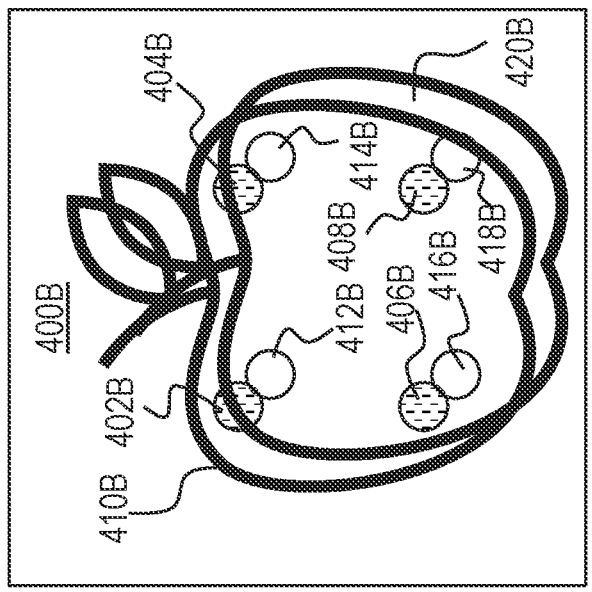
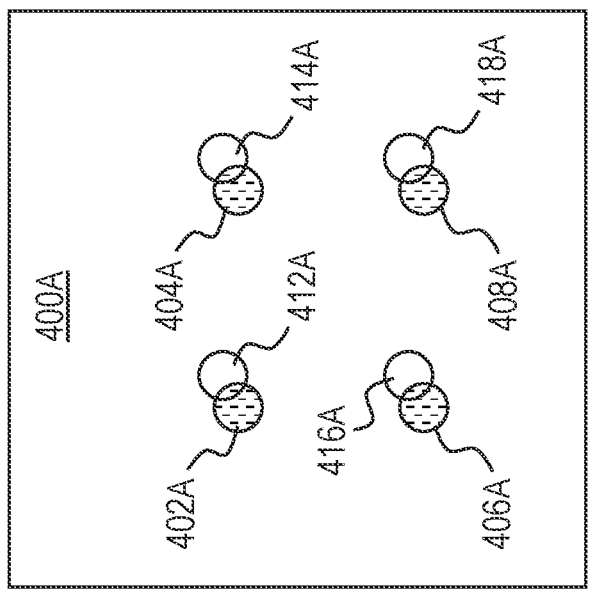
Fig. 4B
Fig. 4A

MONITORING POSITION AND ORIENTATION OF A PROJECTOR

BACKGROUND

A virtual reality (VR) or an augmented reality (AR) device often includes a left projector coupled to a left beam path and a right projector coupled to a right beam path. The left projector is configured to generate a left image, and the left image is then propagated over the left beam path into a left eye of a user. The right projector is configured to generate a right image, and the right image is then propagated over the right beam path into a right eye of a user.

The structure of such a VR/AR device may change from regular use, temperature change, and/or shock. When the structure of the VR/AR device changes, the images may lose boresight and no longer be registered correctly to the VR/AR device. Also, the left and right eye images may lose relative boresight to each other. This problem can become severe in the VR/AR devices that resemble eyeglasses, because such VR/AR devices are not as rigid as traditional VR/AR devices.

Some of the existing VR/AR devices are configured to project calibration images and use the calibration images to determine whether the displays are properly positioned. Because such calibration images are visible to users, user experience is often interfered by calibration/correction operations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a projection system including an illumination light source, a monitor light source, and a projector. The illumination light source is configured to emit an illumination light beam. The monitor light source is configured to emit a monitor light beam. The projector has a reflective spatial light modulator that is configured to project the modulated illumination light beam and the monitor light beam into a projected combined light beam.

In some embodiments, the monitor light beam is modulated by the reflective spatial light modulator of the projector before being propagated over the monitor beam path to generate the monitor image. In such embodiments, the monitor camera may be (but is not limited to) a lensless camera, a camera, or an angular sensitive pixel detector. Alternatively, the monitor light beam is not modulated by the reflective spatial light modulator of the projector before being propagated over the monitor beam path to generate the monitor image. In such embodiments, the monitor camera may be (but is not limited to) a quadrant diode detector, a camera, lensless camera.

The projection system also includes a display beam path configured to propagate a first portion of the projected combined light beam in a first direction. The first portion of the projected combined light beam contains at least a portion of the illumination light beam projected by the projector, causing an eye of the user to see a display image corresponding to the illumination light beam. The head-mounted device also includes a monitor beam path and a monitor camera. The monitor beam path is configured to propagate a second portion of the projected combined light beam in a second direction. The second portion of the projected combined light beam contains at least a portion of the monitor light beam projected by the projector. The monitor camera is configured to receive the second portion of the projected combined light beam and capture a monitor image corresponding to the monitor light beam. The captured image is then analyzed to determine an orientation or a position of the monitor image. In response to determining that the monitor image is not properly oriented or positioned, an orientation or a position of the projector is adjusted; alternatively, or in addition, an orientation or a position of the illumination image is adjusted.

In some embodiments, the projection system is implemented in a head-mounted device. The head-mounted device includes a first projection system and a second projection system, each of which is configured to project a display image at an eye of a user. Each of the first projection system and the second projection system is also configured to project a first monitor light beam and the second light beam, and cause the projected first monitor light beam and the second light beam to be received by a monitor camera. In some embodiments, the head-mounted device includes a single monitor camera configured to receive both the first monitor light beam projected by the first projector and the second monitor light beam projected by the second projector to capture a first monitor image and/or a second monitor image. The first monitor image and/or the second monitor image are then analyzed to determine an orientation or a position of the first monitor image and/or the second monitor image. In response to determining at least one of the first monitor image and/the second monitor image is not properly oriented or positioned, an orientation or a position of the at least one of the first projector and/or the second projector is adjusted; alternatively, or in addition, an orientation or a position of the at least one of the first illumination image and/or the second illumination image is adjusted.

The embodiments described herein are also related to a method implemented at a projection system for monitoring or adjusting positions or orientations of a projector installed thereon. The method includes emitting an illumination light beam from an illumination light source, and emitting a monitor light beam from a monitor light source. The method further includes projecting the illumination light beam into a projected illumination light beam, and projecting the monitor light beam into a projected monitor light beam. The projected illumination beam is propagated over a first beam path in a first direction toward an eye of a user, and the monitor light beam is propagated over a second beam path in a second direction toward a monitor camera. The method also includes capturing, by the monitor camera, a monitor image corresponding to the monitor light beam, and analyzing the monitor image to determine an orientation or a position of the monitor image. In response to determining that the monitor image is not properly oriented or positioned, an orientation or a position of the projector is adjusted; alternatively, or in addition, an orientation or a position of the illumination image is adjusted.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 4A illustrates an example of a monitor image captured by a monitor camera configured to be analyzed to determine whether a relative boresight to the left and right eyes projectors is aligned;

FIG. 4B illustrates another example of a monitor image captured by a monitor camera configured to be analyzed to determine whether a relative boresight to left and right eyes projectors is aligned;

DETAILED DESCRIPTION

Figure 1A:
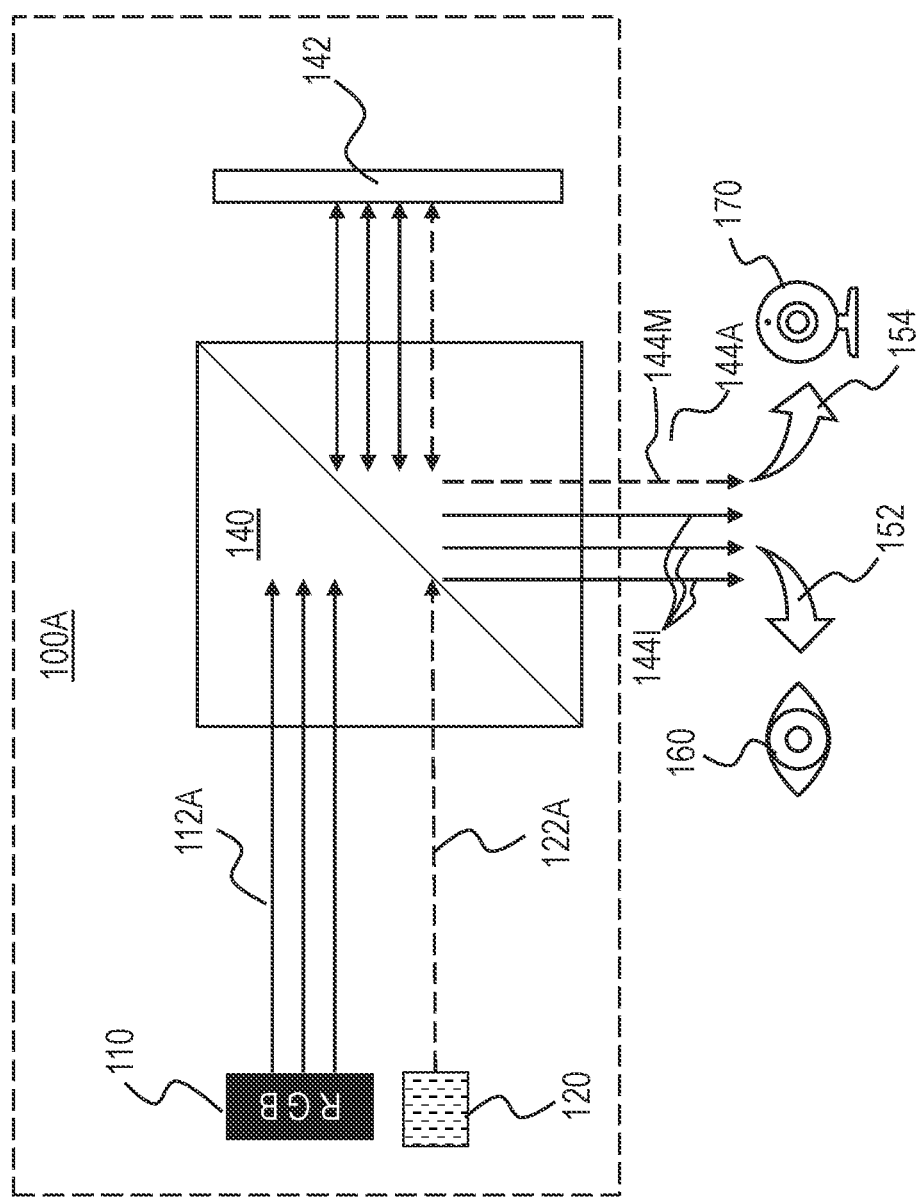
FIG. 1A illustrates an example architecture of a projection system that implements the principles described herein.

A virtual reality (VR) or an augmented reality (AR) device often includes a left projector coupled to a left beam path and a right projector coupled to a right beam path. The left projector is configured to generate a left image, and the left image is then propagated over the left beam path into a left eye of a user. The right projector is configured to generate a right image, and the right image is then propagated over the right beam path into a right eye of a user.

The structure of such a VR/AR device may change from regular use, temperature change, and/or shock. When the structure of the VR/AR device changes, the images may lose boresight and no longer be registered correctly to the VR/AR device. Also, the left and right eye images may lose relative boresight to each other. This problem can become severe in the VR/AR devices that resemble eyeglasses, because such VR/AR devices are not as rigid as traditional VR/AR devices.

Some of the existing VR/AR devices are configured to project calibration images and use the calibration images to determine whether the displays are properly positioned. Because such calibration images are visible to users, the user experience is often interfered with by calibration/correction operations.

The principles described herein solve the above-described problem by using a monitor light source (such as a laser diode or an array of laser diodes) to generate a monitor light beam to monitor the position and orientation of a projector. The projector has a reflective spatial light modulator, such as (but not limited to) liquid crystal on silicon (LCOS), digital micromirror device (DMD), grating light valve (GLV). The monitor light beam is directed into a monitor camera to obtain direct feedback, which can then be used to correct boresight changes in a VR/AR device. In some embodiments, a single camera is configured to combine the images from left and right eyes projectors and reduce the error in that measurement. In some embodiments, the monitor light source may be one or more edge emitter diodes or one or more vertical-external-cavity surface-emitting-laser (VECSEL) diodes with a very narrow wavelength band. In some embodiments, the monitor light source is an array of edge emitter diodes or VECSEL diodes configured to project an array of dots.

It is advantageous to use a laser light beam with a very narrow wavelength band as the monitor light beam because such a laser wavelength band may be chosen to be invisible to the user, or different than the illumination light beam (which is a visible light beam), such that the monitor light beam may be filtered from the illumination light beam. Further, the laser light power can be set to be greater than the illumination light itself, which overcomes signal-to-noise ratio issues at the monitor camera. Additionally, such a narrow wavelength band can be used with a very compact monitor camera based on a phase lens.

In some embodiments, the monitor light beam is modulated by the reflective spatial light modulator of the projector before being propagated over the monitor beam path to generate the monitor image. In such embodiments, the monitor camera can include (but is not limited to) a lensless camera or an angular sensitive pixel detector, a position sensing detector, and/or a quadrant diode detector. Alternatively, the monitor light beam is not modulated by the reflective spatial light modulator of the projector before being propagated over the monitor beam path to generate the monitor image, and the monitor camera can include (but is not limited to) a quadrant diode detector, a camera, and/or a lensless camera.

In some embodiments, the monitor light beam is directed into a different path in the beam path than the projector, which further improves the signal to noise at the monitor camera. Further, the dedicated beam path for the monitor signal that is separate from the projector signal provides laser safety to the end-user because there is no pathway that directs it toward the eyes of the user. The monitor camera enables measurement of the pose of left and right images or changes of both images together and monitors the correction applied. The projector can use multiple different projector designs, including (but not limited to) a multi-element lens system similar to the phone camera, birdbath that uses an additional curved mirror, etc. The integration of the monitor light beam and the illumination light beam can be from a same side (in parallel or forming an angle) or from different sides combined with a beam combiner, such as a dichroic beam combiner.

FIG. 1A illustrates an example architecture of a projection system 100A that implements the principles described herein. The projection system 100A includes an illumination light source 110, a monitor light source 120, and a projector 140. The illumination light source 110 is configured to emit an illumination light beam 112A at the projector 140, and the monitor light source 120 is configured to emit a monitor light beam 122A at the projector 140. In some embodiments, the projector 140 includes a reflective spatial light modulator 142 configured to modulate the light beams 112A and 122A to generate an output 144A of the projector 140. The output 144A of the projector 140 is a projected combined light beam 144A that contains a projected illumination light beam 144I and a projected monitor light beam 144M.

Thereafter, the projected illumination light beam 144I is directed to an illumination beam path 152 toward an eye 160 of a user, causing the eye 160 of the user to see a display image corresponding to the illumination light beam 112A; the projected monitor light beam 144M is directed to the monitor camera 170, causing the monitor camera 170 to capture a monitor image corresponding to the monitor light beam 122A. Since the illumination light beam 112A and the monitor light beam 122A are both projected through the projector 140, the monitor image captured by the monitor camera 170 can be used to determine an orientation or a position of the monitor image. The monitor camera 170 can be (but is not limited to) a lensless camera, an angular sensitive pixel detector, and/or a quadrant diode detector as a position sensing detector.

In some embodiments, the illumination light source 110 is configured to emit light beams in a first wavelength band, e.g., visible Red-Green-Blue (RGB) light beam, including a red light beam, a green light beam, a blue light beam, or a combination thereof. The monitor light source 120 is configured to emit light beams in a second wavelength band, e.g., invisible light, such that the image generated by the monitor light source is only detectable to the monitor camera 170, but invisible to the human eyes.

In some embodiments, the illumination beam path 152 is configured to propagate light in the first wavelength band, and the monitor beam path 154 is configured to propagate light in the second wavelength band. As such, the projected combined light beam 144A is split into the illumination beam path 152 and the monitor beam path 154. In some embodiments, a filter is disposed before the illumination beam path 152 to filter out the light beam in the second wavelength, such that only the light beam in the first wavelength band is propagated over the illumination beam path 152. Alternatively, or in addition, a filter is disposed before the monitor beam path 154 to filter out the light beam in the first wavelength, such that only the monitor light beam in the second wavelength band is propagated over the monitor beam path 154.

Since the monitor light beam 112A is directed into a different path than the illumination light beam, it further improves the signal-to-noise ratio at the monitor camera 170. In some embodiments, a power of the monitor light beam is greater than a power of the illumination light beam, such that the signal-to-noise ratio is further improved to allow identification of the monitor image at the camera 170.

In some embodiments, the illumination light source 110 is configured to emit an illumination light beam in a first direction, and the monitor light source 120 is configured to emit a monitor light beam in a second direction that intersects the first direction. In some embodiments, the illumination light beam and the monitor light beam intersect at a first location in the projector, and output at two separate locations of the projector, namely a second location and a third location. The output beams are then propagated in different directions. The projected illumination light beam is propagated in a first direction toward an eye of a user, and the projected monitor light beam is propagated in a second direction toward a monitor camera.

Alternatively, in some embodiments, a beam combiner can be used to combine the illumination light and the monitor light into a combined light beam directed to the projector 140.

Figure 1B:
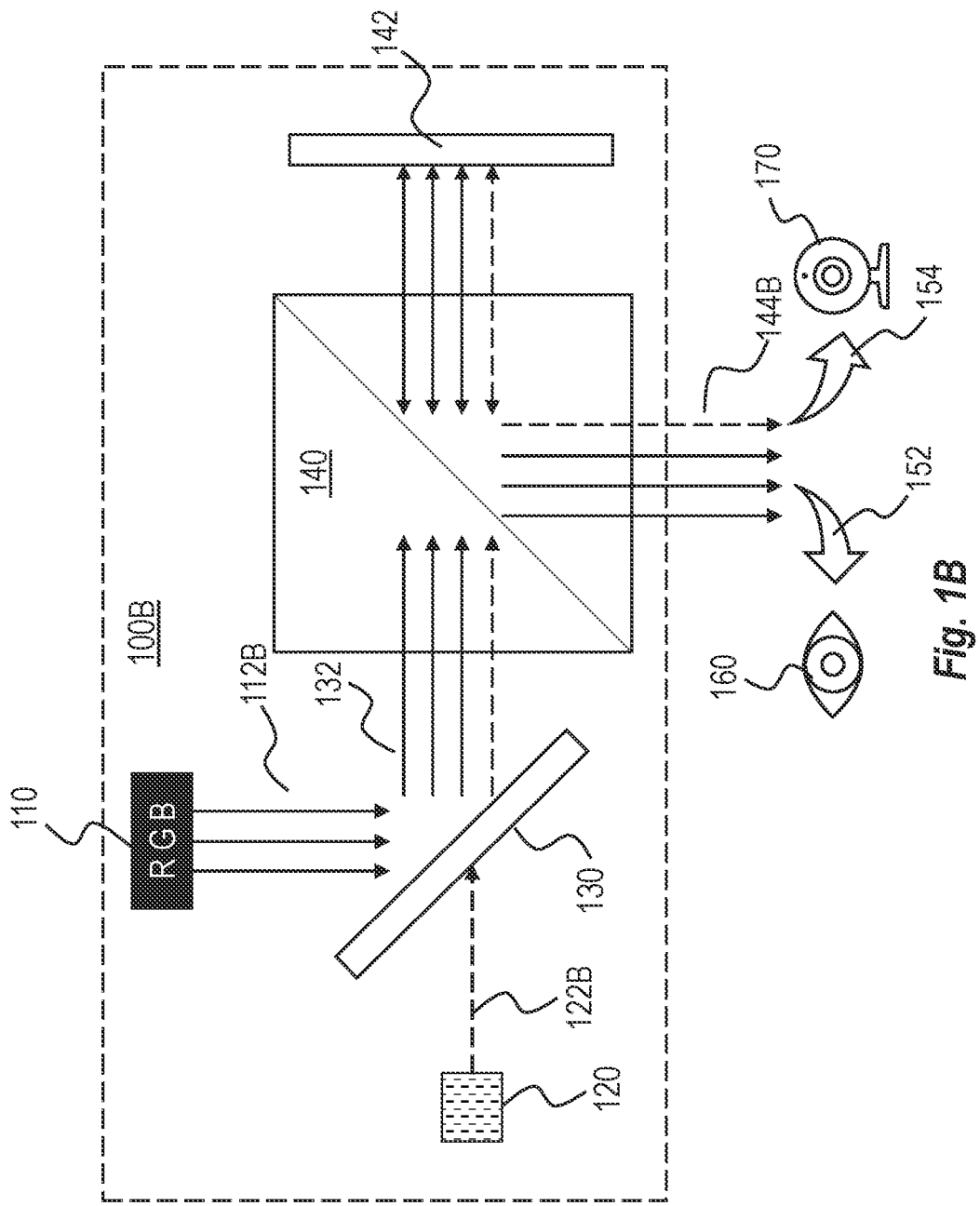
FIG. 1B illustrates another example architecture of a projection system that implements the principles described herein.

FIG. 1B illustrates an example architecture of a projection system 100B that includes a beam combiner 130 configured to combine an illumination light 112B and a monitor light beam 122B into a combined light beam 132 directed to the projector 140. The projector 140 is configured to project the combined light beam 132 into a projected combined light beam 144B. Similar to the projected combined light beam 144A in FIG. 1A, the projected combined light beam 144B is split and propagated over two different beam paths 152, 154.

The projection system 100A or 100B illustrated in FIG. 1A or 1B can be implemented in a portable projector and/or a head-mounted device, such as a VR/AR device, allowing the portable projector and/or the head-mounted device to self-monitor and/or adjust its boresight alignment. Notably, when implemented in a head-mounted device, two such projection systems are likely implemented, one for the left eye, and the other for the right eye.

Note, even though, as illustrated in FIGS. 1A and 1B, the monitor light beam 122A or 122B appears to be modulated by the reflective spatial light modulator 142, it is not necessary that the monitor light beam 122A or 122B must be modulated by the reflective spatial light modulator 142. In some embodiments, the monitor light beam 122A is not modulated by the reflective spatial light modulator 142 before being propagated over the monitor beam path 154. In such an embodiment, the monitor camera can be (but is not limited to) a quadrant diode detector, a camerae, or a lensless camera.

Figure 2A:
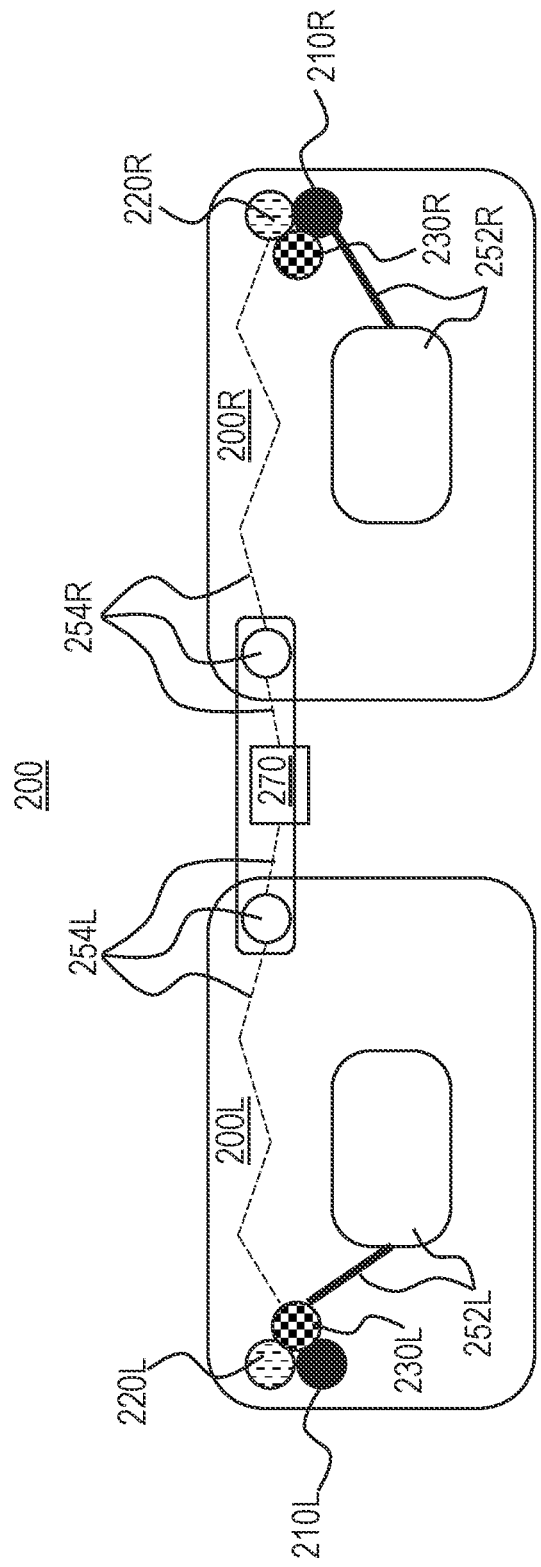
FIG. 2A illustrates a front view of an example head-mounted device that implements the principles described herein.
Figure 2B:
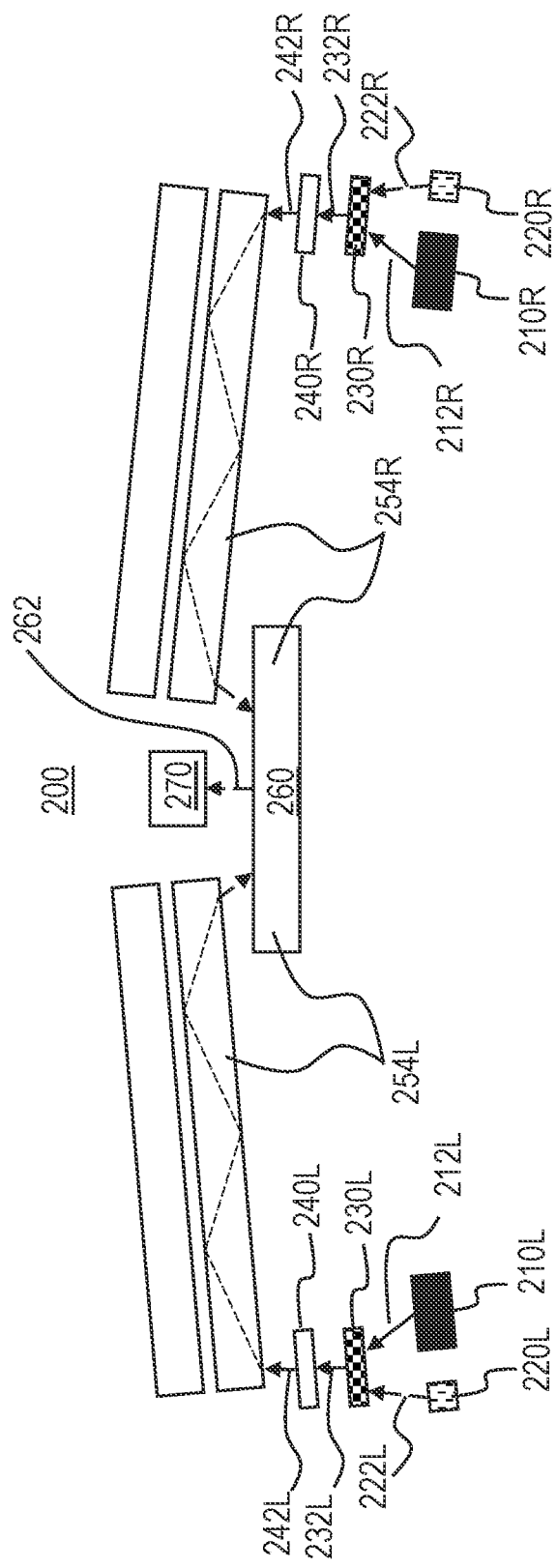
FIG. 2B illustrates a top view of an example head-mounted device that implements the principles described herein.

FIGS. 2A and 2B illustrate a front view and a top view of an example head-mounted device 200 that implements a left projection system 200L and a right projection system 200R, each of which corresponds to the projection system 100A or 100B of FIG. 1A or 1B. As illustrated, the left projection system 200L includes an illumination light source 210L (corresponding to the illumination light source 110 of FIG. 1A or 1B), and a monitor light source 220L (corresponding to the monitor light source 120 of FIG. 1A or 1B). In some embodiments, the left projection system 200L also includes a beam combiner 230L (corresponding to the beam combiner 130 of FIG. 1B).

Referring to FIG. 2B, the illumination light source 210L is configured to emit an illumination light beam 212L, and the monitor light source 220L is configured to emit a monitor light beam 222L. The beam combiner 230L is configured to combine the illumination light beam 212L and the monitor light beam 222L into a combined light beam 232L, which is then projected by a projector 240L into a projected combined light beam 242L.

Referring to FIG. 2A, the head-mounted device 200 also includes an illumination beam path 252L (corresponding to the illumination beam path 152 of FIG. 1A or 1B) and a monitor beam path 254L (corresponding to the monitor beam path 154 of FIG. 1A or 1B). A first portion of the projected combined light beam is propagated over the illumination beam path 252L toward an eye of a user (not shown), and a second portion of the projected combined light beam is propagated over the monitor beam path 254L toward the camera 270 (which corresponds to the monitor camera 170 of FIG. 1A or 1B). The first portion of the projected combined light beam contains at least a portion of the illumination light beam projected by the projector 240L, causing the eye of the user to see a display image corresponding to the illumination light beam. The second portion of the projected combined light beam contains at least a portion of the first monitor light beam projected by the projector 240L.

Referring to FIG. 2B again, in some embodiments, the two monitor beam paths 254L and 256L include a beam combiner 260 configured to combine the two monitor beams into a combined monitor beam 262. The combined monitor beam 262 is then propagated into the monitor camera 270.

The monitor camera 270 is configured to receive the second portion of the projected combined light beam and capture a monitor image corresponding to the monitor light beam projected by the projector 240L. The monitor image is then analyzed to determine an orientation or a position of the monitor image. In response to determining that the monitor image is not properly oriented or positioned, an orientation or a position of the projector 240L is adjusted; alternatively, or in addition, an orientation or a position of the illumination image is adjusted. For example, in some embodiments, the image data associated with the illumination image is transformed to cause the illumination image to be rotated for a particular angle based on the orientation of the monitor image. As another example, in some embodiments, the image data associated with the illumination image may be transformed to cause the illumination image to be moved, enlarged, and/or reduced.

In some embodiments, the illumination light source 210L is configured to emit light beams in a first wavelength band, e.g., visible light, and the monitor light source 220L is configured to emit light beams in a second wavelength band, e.g., invisible light, such that the image generated by the monitor light source is only visible to the monitor camera 270, but invisible to the user. In some embodiments, a power of the monitor light beam is greater than a power of the illumination light beam, such that the monitor image captured by the monitor camera 270 has a sufficient signal-to-noise ratio to allow identification of the monitor image.

In some embodiments, the illumination beam path 252L is configured to propagate light in the first wavelength band, and the monitor beam path 254L is configured to propagate light in the second wavelength band. As such, the projected combined light beam is split into the illumination beam path 252L and the monitor beam path 254L. In some embodiments, a filter is disposed before the illumination beam path 252L to filter out the light beam in the second wavelength, such that only the light beam in the first wavelength band is propagated over the illumination beam path 252L. Alternatively, or in addition, a filter is disposed before the monitor beam path 254L to filter out the light beam in the first wavelength, such that only the monitor light beam in the second wavelength band is propagated over the monitor beam path 254L.

Figure 3B:
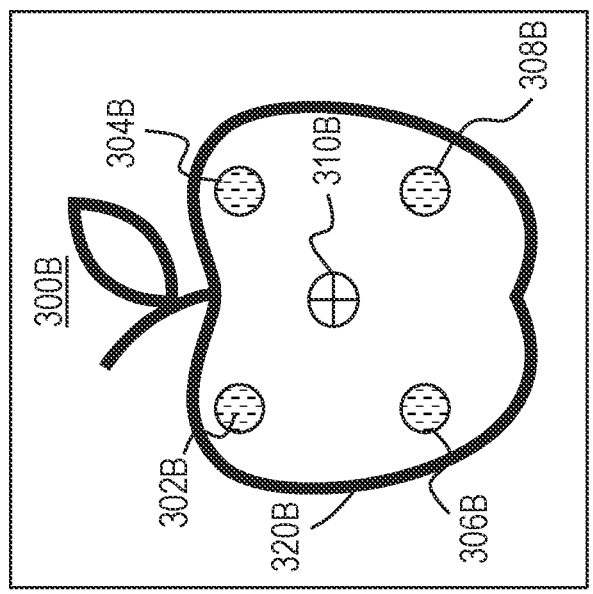
FIG. 3B illustrates another example of a monitor image captured by a monitor camera to be analyzed.
Figure 3A:
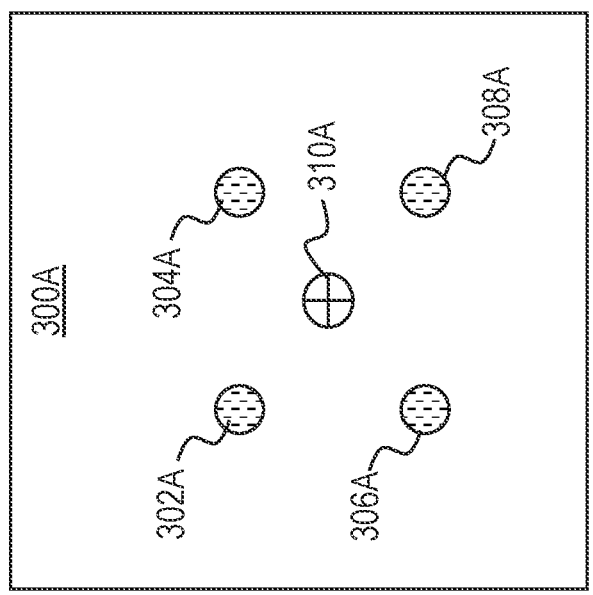
FIG. 3A illustrates an example of a monitor image captured by a monitor camera to be analyzed.

In some embodiments, the monitor image includes a predetermined set of dots or lines. FIGS. 3A and 3B illustrate examples of monitor images that are captured by the monitor camera 270. As illustrated in FIG. 3A, a monitor image 300A includes a grid of four dots 302A, 304A, 306A, 308A, which can be achieved by filtering out light beams in the first wavelength band, and/or using a monitor beam path 254L configured to propagate light beams in the second wavelength band. In some embodiments, the monitor image 300A is compared with a boresight 310A of the monitor camera 270 to determine whether the monitor image 330A is properly oriented or positioned.

As illustrated in FIG. 3B, a monitor image 300B includes a grid of four dots 302B, 304B, 306B, 308B overlaid with a display image 320B, which may be caused by without filtering out the light beam in the first wavelength band, or using a beam path configured to propagate light beams in both the first wavelength band and the second wavelength band. The monitor image 300B can also be compared with a boresight 310B of the monitor camera 270 to determine whether the monitor image 300B is properly oriented or positioned. In some embodiments, a power of the monitor light beam 222L, 222R is greater (or significantly greater) than a power of the illumination light beam 212L, 212R, such that the signal-to-noise ratio is further improved to allow the identification of the monitor image.

Referring back to FIGS. 2A-2B, the head-mounted device 200 further includes a second illumination light source 210R, a second monitor light source 220R, a second beam combiner 230R, a second illumination beam path 252R, and a second monitor beam path 254R, each of which is similar to the respective first illumination light source 210L, a first monitor light source 220L, a first beam combiner 230L, a first illumination beam path 252L, and a first monitor beam path 254L. The first set of components 210L, 220L, 230L, and 240L, and the second set of components 210R, 220R, 230R, and 240R are symmetrically disposed on the left and right sides of the head-mounted device 200. The first set of components 210L, 220L, 230L, and 240L are configured to project a first image at a first eye of the user, and the second set of components 210R, 220R, 230R, and 240R are configured to project a second image at a second eye of the user.

In some embodiments, the monitor camera 270 is configured to receive a portion of a first projected combined light beam from the first monitor beam path 254L and/or a portion of a second projected combined light beam from the second monitor beam path 254R. The monitor camera 270 is configured to capture a first monitor image based on the first light beam received from the first monitor beam path 254L, and/or capture a second monitor image based on the second light beam received from a second monitor beam path 254R. In some embodiments, the first monitor image or the second monitor image is individually analyzed to determine whether each of the first monitor image or the second monitor is properly oriented or positioned. In some embodiments, the monitor camera 270 is configured to capture the first monitor image and the second monitor image overlaid with each other. In some embodiments, the first monitor image is compared with the second monitor image to determine whether relative boresight to two eyes is aligned.

In some embodiments, a separate monitor camera is implemented for each projection system. For example, in some embodiments, a head-mounted device includes a first monitor camera configured to capture a first monitor image from a first projector, and a second monitor camera configured to capture a second monitor image from a second projector. The captured first monitor image and second monitor image can then be compared with a respective boresight of the first camera and the second camera, or compared with each other to determine a relative boresight to each other.

FIGS. 4A and 4B illustrate an example of images 400A, 400B captured by the monitor camera 270 in which a first monitor image (received from the first monitor beam path 254L) and a second monitor image (received from the second monitor beam path 254R) are overlaid with each other. As illustrated in FIG. 4A, image 400A captured by the monitor camera 270 includes a first monitor image having a first grid of four dots 402A, 404A, 406A, 408A; and a second monitor image having a second grid of four dots 412A, 414A, 416A, 418A. The first monitor image and the second monitor image are overlaid with each other. As shown in FIG. 4A, the first grid of four dots 402A, 404A, 406A, 408A are not aligned with the second grid of four dots 412A, 414A, 416A, 418A, indicating that the relative boresight to two eyes is not aligned. In some embodiments, in response to determining that the relative boresight to two eyes is not aligned, the head-mounted device 200 is configured to adjust an orientation or a position of at least one of the first projector or a second projector (or the first illumination image and/or the second illumination image) to cause the relative boresight to be aligned.

FIG. 4B illustrates an example of an image 400B captured by the monitor camera 270 includes a first display image 410B, a first monitor image having a first grid of four dots 402B, 404B, 406B, 408B, second display image 420B, and a second monitor image having a second grid of four dots 412B, 414B, 416B, 418B. The first display image 410B, the first monitor image, the second display image 420B, and the second monitor image are overlaid with each other. In some embodiments, the overlaid image 400B is further processed to extract the first monitor image and/or the second monitor image. The extracted first monitor image and/or the second monitor image are then analyzed to determine whether monitor image and/or the second monitor image is properly oriented or positioned.

Figure 5:
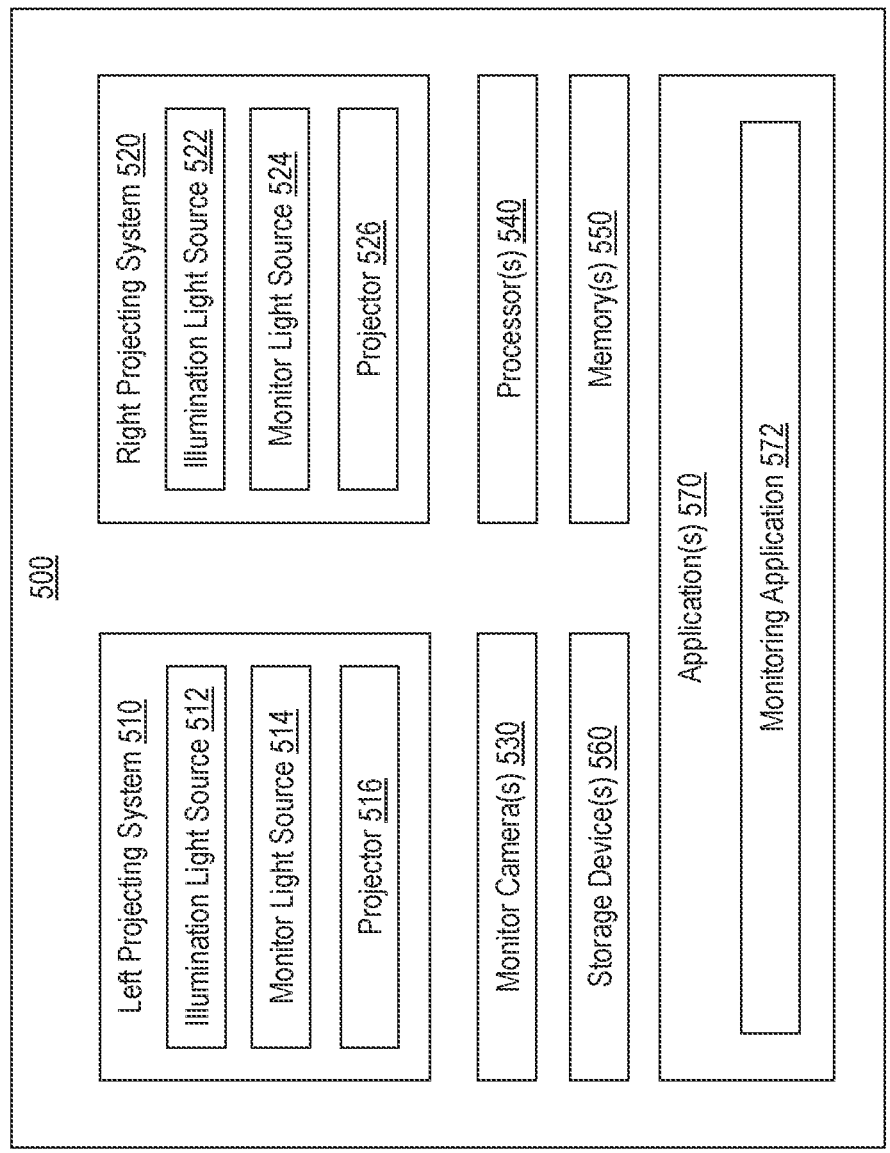
FIG. 5 illustrates an example architecture of a head-mounted device that implements the principles described herein.

FIG. 5 illustrates an example architecture of a head-mounted device 500 (which corresponds to the head-mounted device 200 of FIG. 2A or 2B). The head-mounted device 500 includes a left projection system 510 and a right projection system 520, each of which corresponds to a projection system 100A or 100B of FIG. 1A or 2B. The left projection system 510 includes an illumination light source 512, a monitor light source 514, and a projector 516. The right projection system 520 includes an illumination light source 522, a monitor light source 524, and a projector 526.

The head-mounted device 500 further includes one or more monitor cameras 530 configured to receive and capture a monitor image generated by the monitor light source 514 and/or 524. In some embodiments, a single monitor camera is used to capture monitor images from both the left projection system 510 and the right projection system 520. In some embodiments, a left camera is configured to capture a monitor image from the left projection system 510, and a right camera is configured to capture a monitor image from the right projection system 520.

The head-mounted device 500 is also a computer system including one or more processors 540, one or more memories 550, and one or more hardware storage devices 560.

Firmware and/or other applications 570 are stored in the one or more hardware storage devices 560 and can be loaded into the one or more memories 550. The applications 570 includes at least a monitoring application 572 configured to cause the monitor light source 514, 524 to emit a monitor light beam, cause the monitor camera(s) 530 to capture one or more monitor images, and analyze the captured one or more monitor images to determine whether the monitor images are properly positioned. In some embodiments, the monitoring application 572 is configured to compare the captured monitor image with a boresight of the camera to determine whether the projector 516, 526 is aligned with the respective boresight. In some embodiments, the monitoring application 572 is configured to compare a monitor image generated by the left projection system 510 and a monitor image generated by the right projection system 520 to determine whether the relative boresight between the left projector 516 and the right projector 526 is aligned to each other. In response to determining that the monitor image is not properly oriented or positioned, the monitoring application 572 causes a position and/or an orientation of the projector 516 or 526 to be adjusted; alternatively or in addition, the monitoring application 572 causes a position and/or an orientation of the illumination image to be adjusted. For example, in some embodiments, the image data associated with the illumination image is transformed to cause the illumination image to be rotated for a particular angle based on the orientation of the monitor image. As another example, in some embodiments, the image data associated with the illumination image may be transformed to cause the illumination image to be moved, enlarged, and/or reduced.

In some embodiments, the monitoring application 572 is configured to check on the projectors 516, 526 at a predetermined frequency, such as (but not limited to) every month, every hour, every 30 minutes, every 10 minutes, etc. In some embodiments, the monitoring application 572 is configured to check on the projectors 516, 526 each time the head-mounted device 500 is powered on and/or turned off. In some embodiments, the monitoring application 572 is configured to check on the projectors 516, 526 based on a user setup or input. For example, in some embodiments, a hardware or software button is implemented on the head-mounted device 500, and in response to pressing the button, the monitoring application 572 is configured to check on the projectors 516, 526. As another example, in some embodiments, the user can input the times and/or the frequency that the projectors 516, 526 are checked on and adjusted.

Figure 6:
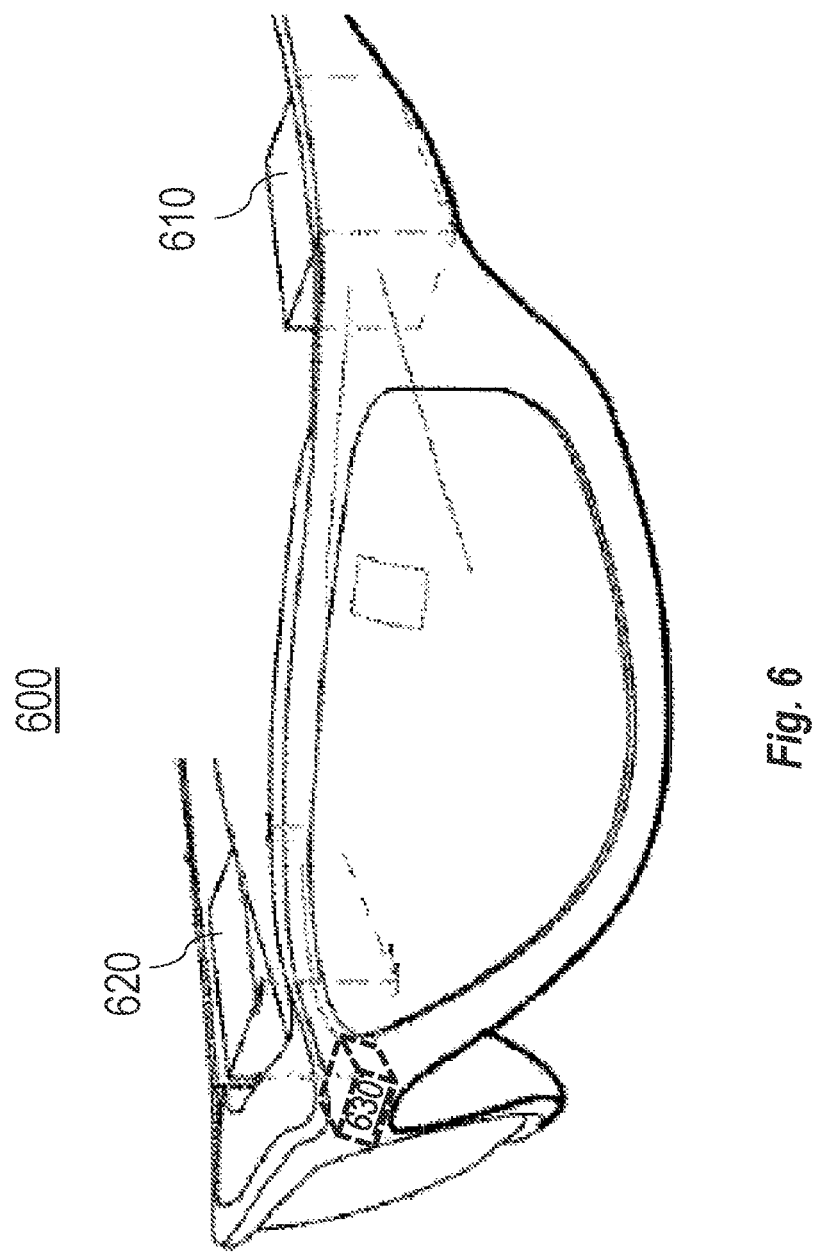
FIG. 6 illustrates an example of a glass-formed head-mounted device that implements the principles described herein.

FIG. 6 illustrates an example of a glass-formed head-mounted device 600, which corresponds to the head-mounted device 200 of FIG. 2A or 2B, or 500 of FIG. 5. As illustrated in FIG. 6, the glass-formed head-mounted device 600 includes a left projection system 620 (which corresponds to the left projection system 510 of FIG. 5), a right projection system 620 (which corresponds to the right projection system 520 of FIG. 5), and a monitor camera 630 (which corresponds to the camera 530 of FIG. 5). In embodiments, each of the projection systems 610, 620 is embedded in temples of glass-formed head-mounted device 600, and the monitor camera 630 is embedded in a nose bridge of the head-mounted device 600.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
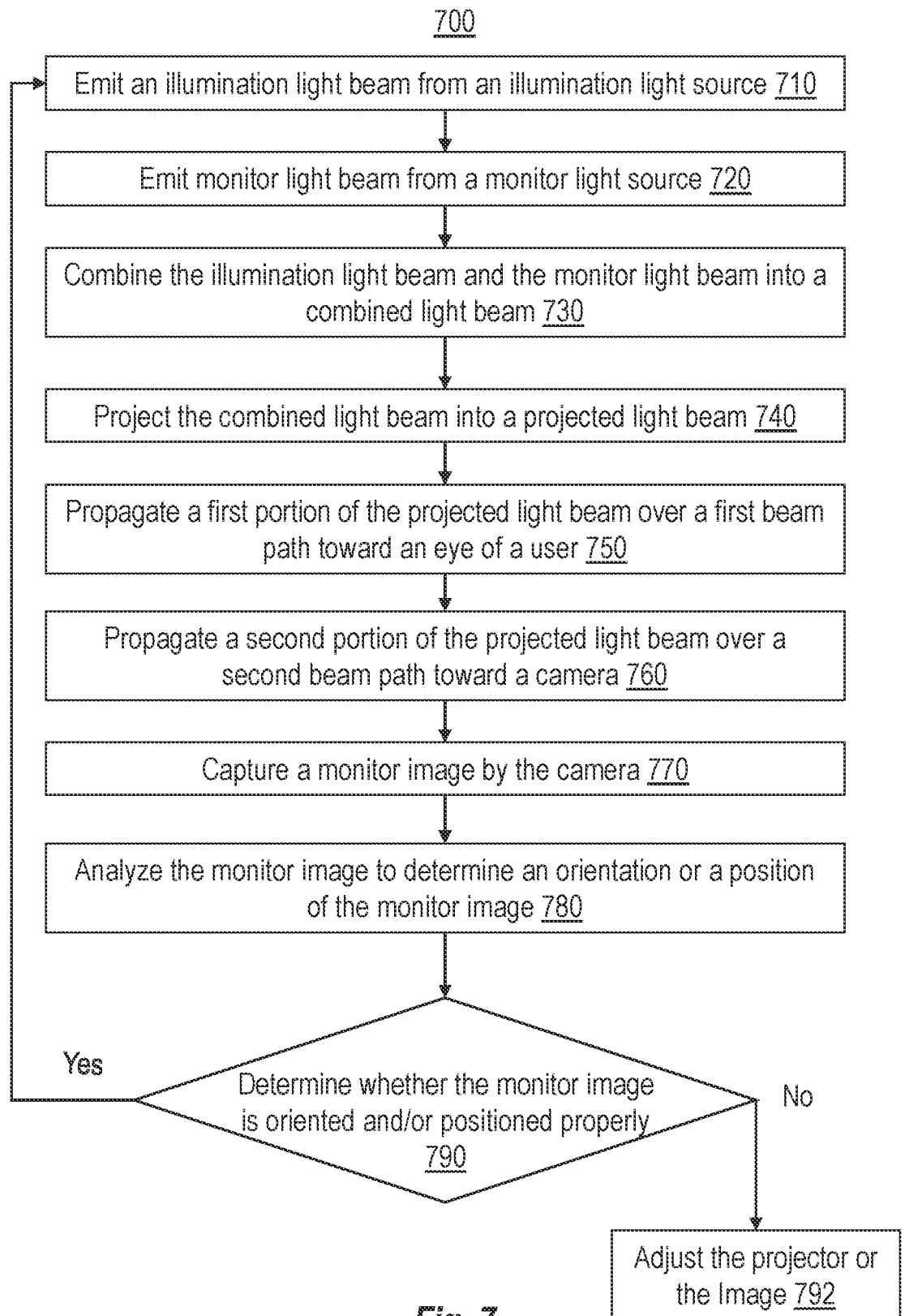
FIG. 7 illustrates a flowchart of an example method implemented at a projection system for monitoring or adjusting positions or orientations of a projector installed thereon.

FIG. 7 illustrates a flowchart of an example method 700 implemented at a projection system (e.g., a projection system 100A, 100B) for monitoring or adjusting positions or orientations of a projector installed thereon. The method 700 includes emitting an illumination light beam from an illumination light source (act 710), and emitting a monitor light beam from a monitor light source (act 720). The method also includes projecting, by the projector, the illumination light beam, and the monitor light beam into a projected combined light beam (act 740).

In some embodiments, the illumination light beam and the monitor light beam are directed at different directions that intersect each other, and the method 700 further includes combining the illumination light beam and the monitor light beam into a combined light beam directed at the projector (act 730), and the projector is configured to project the combined light beam into the projected combined light beam.

The method 700 further includes propagating a first portion of the projected light beam over a first beam path toward an eye of a user (act 750), and propagating a second portion of the projected light beam over a second beam path toward a monitor camera (act 760). The first portion of the projected combined light beam contains at least a portion of the illumination light beam projected by the projector, causing the eye of the user to see a display image corresponding to the illumination light beam. The second portion of the projected combined light beam contains at least a portion of the monitor light beam projected by the projector.

The method 700 further includes capturing a monitor image, by the monitor camera, corresponding to the monitor light beam (act 770), analyzing the monitor image to determine an orientation or a position of the monitor image (act 780), and determining whether the monitor image is properly oriented or positioned (act 790) In response to determining that the monitor image is not oriented or positioned properly, an orientation or a position of the projector is adjusted (act 792); alternatively or in addition, an orientation or a position of the illumination image is adjusted (act 792). In some embodiments, in response to determining that the monitor image is oriented and/or positioned properly, the projection system repeats the acts 710-792 again, which may be based on a user input, at a predetermined time, and/or at a predetermined frequency.

Figure 8:
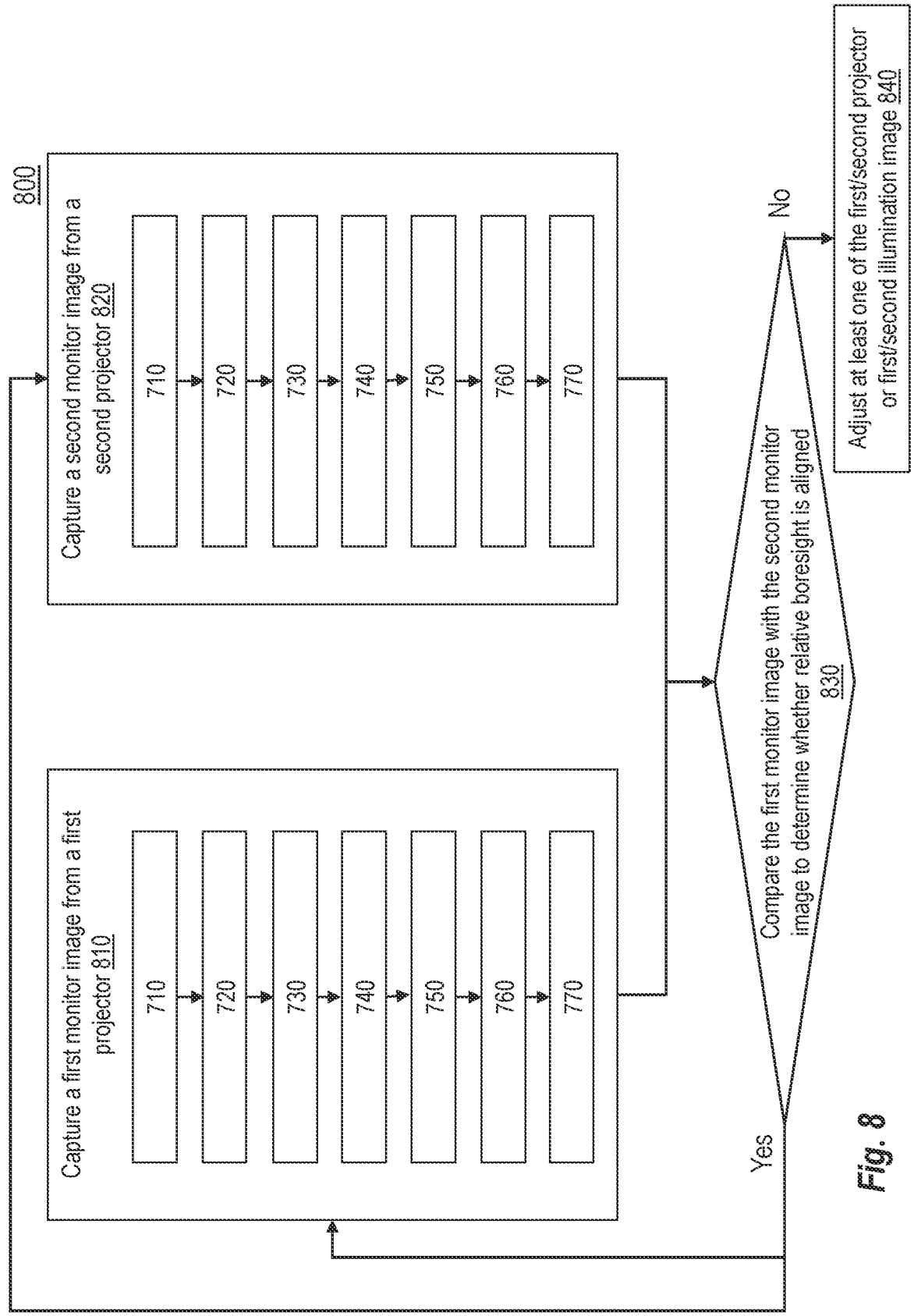
FIG. 8 illustrates a flowchart of an example method implemented at a head-mounted device for monitoring and/or adjusting relative boresight to left and right eyes projectors.

FIG. 8 illustrates a flowchart of an example method 800 implemented at a head-mounted device (e.g., an VR/AR device) for monitoring and/or adjusting relative boresight to the left and right eyes projectors. The method 800 includes capturing a first monitor image from a first projector (act 810) and capturing a second monitor image from a second projector (act 820). Each of the first projector and second projector configured to project an image for a first eye or a right eye of a user. Each of act 810 or 820 includes acts 710 through 770 of method 700.

Capturing the first monitor image from the first projector (act 810) is performed by a first projection system, including a first illumination light source, a first monitor light source, a first beam path, a second beam path, and a camera. Act 810 includes emitting a first illumination light beam from a first illumination light source (act 710), emitting a first monitor light beam from a first monitor light source (act 720), and projecting (by a first projector) the illumination light beam and the monitor light beam into a first projected light beam (act 740). In some embodiments, the first illumination light source and the first monitor light source are configured to emit light in different directions that interest each other, and the act 810 further includes combining the first illumination light beam and the first monitor light beam into a first combined light beam directed at the first projector (act 730). Act 810 also includes propagating a first portion of the first projected combined light beam over a first beam path toward a first eye of a user (act 750), and propagating a second portion of the projected light beam over a second beam path toward a camera (act 760), and capturing a monitor image by the camera (act 770).

Similarly, capturing the second monitor image from the second projector (act 820) (including acts 710-770) is performed by a second projection system, including a second illumination light source, a second monitor light source, a third beam path, a fourth beam path, and a camera.

In some embodiments, the first projection system and the second projection system share a same camera. In some embodiments, the first projection system includes a first camera, and the second projection system includes a second camera. In some embodiments, the first monitor image and the second monitor image are captured as overlaid with each other. In some embodiments, the first monitor image and the second monitor image are captured separately.

The first monitor image and the second monitor image are then compared with each other to determine whether relative boresight to the first projector and the second projector is aligned with each other (act 830). In response to determining that the relative boresight is not aligned, an orientation or a position of at least one of the first or second projector is adjusted (act 840). In some embodiments, in response to determining that the relative boresight is aligned, the projection system repeats the acts 810-830 again, which may be based on a user input, at a predetermined time, and/or at a predetermined frequency.

In some embodiments, the illumination beam and monitor beam are not combined or in parallel. The illumination beam and monitor beam intersect inside the projector, and come out at two separate locations. Such embodiments make it easy to send illumination beam to the eye of the user and monitor beam to the monitor camera.

Figure 9:
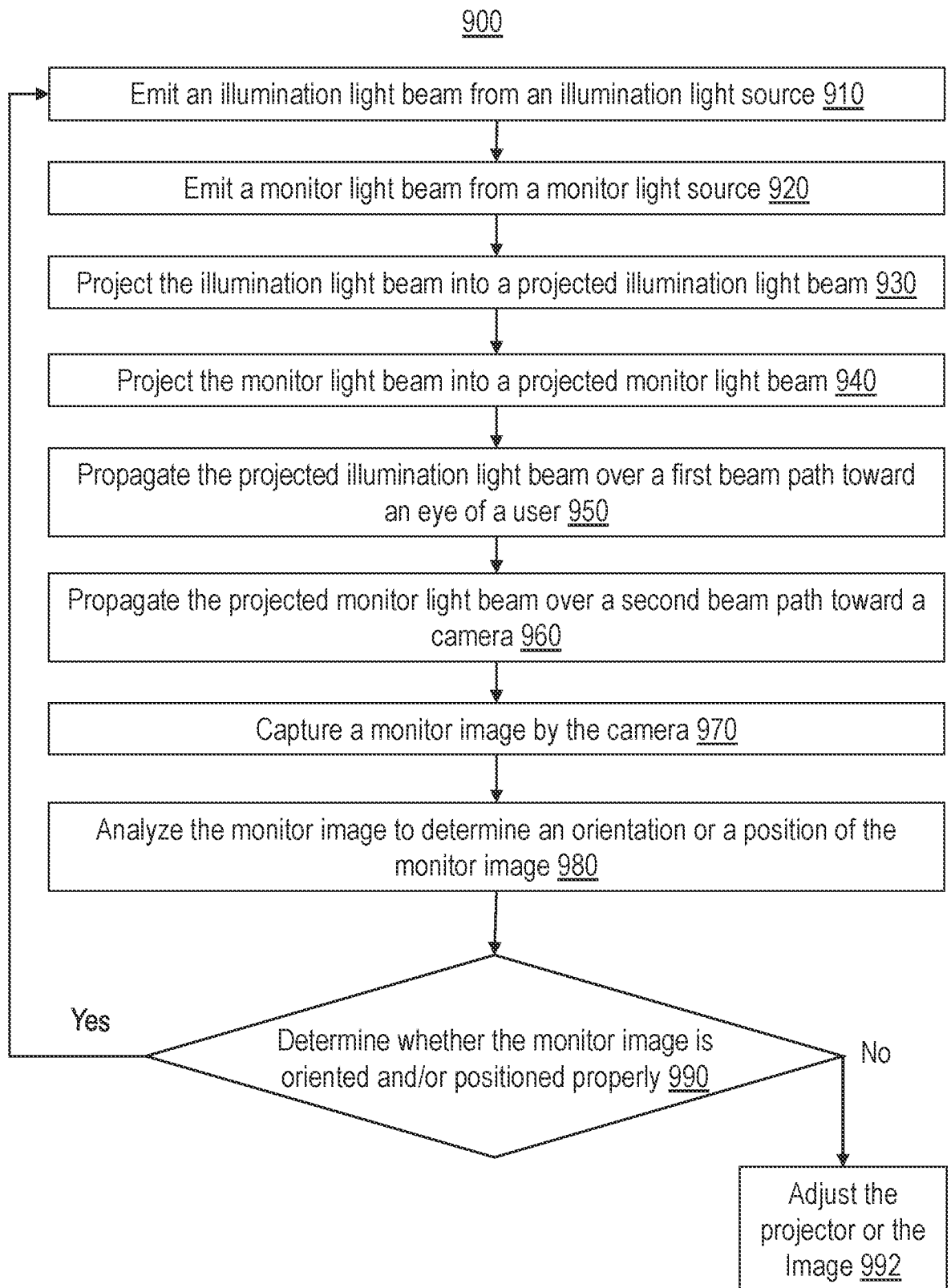
FIG. 9 illustrates a flowchart of another example method implemented at a projection system for monitoring or adjusting positions or orientations of a projector installed thereon.

FIG. 9 illustrates a flowchart of an example method 900 for implementing the above-described embodiments. The method 900 includes emitting an illumination light beam from an illumination light source (act 910) and emitting a monitor light beam from a monitor light source (act 920). The method 900 further includes projecting the illumination light beam into a projected illumination light beam (act 930) and projecting the monitor light beam into a projected monitor light beam (act 940). In embodiments, the illumination beam and monitor beam intersect inside the projector, and come out at two separate locations as projected illumination beam and projected monitor beam.

The projected illumination beam is propagated over a first beam path toward an eye of a user (act 950), and the projected monitor light beam is propagated over a second beam path toward a camera (act 960). A monitor image is captured by the camera (act 970) and analyzed to determine an orientation or a position thereof (act 980). It is then determined whether the monitor image is oriented and/or positioned properly (act 990). Similar to method 700 of FIG. 7, in response to determining that the monitor image is not oriented and/or positioned properly, an orientation and/or a position of the projector is adjusted (act 992). Alternatively, or in addition, an orientation and/or a position of the illumination image is adjusted (act 992). Also similar to method 700 of FIG. 7, acts 910-970 can be used in act 810 or 820 of FIG. 8 to align a relative boresight of a head-mounted device.

Finally, because the principles described herein may be performed in the context of a computer system, some introductory discussion of a computer system will be described with respect to FIG. 10.

Computer systems are now increasingly taking a wide variety of forms. Computer systems may, for example, be hand-held devices, appliances, laptop computers, desktop computers, mainframes, distributed computer systems, data centers, or even devices that have not conventionally been considered a computer system, such as wearables (e.g., glasses). In this description and in the claims, the term "computer system" is defined broadly as including any device or system (or a combination thereof) that includes at least one physical and tangible processor, and a physical and tangible memory capable of having thereon computer-executable instructions that may be executed by a processor. For example, a projector or a head-mounted device 200, 500, 600 is a computer system. The memory may take any form and may depend on the nature and form of the computer system. A computer system may be distributed over a network environment and may include multiple constituent computer systems.

Figure 10:
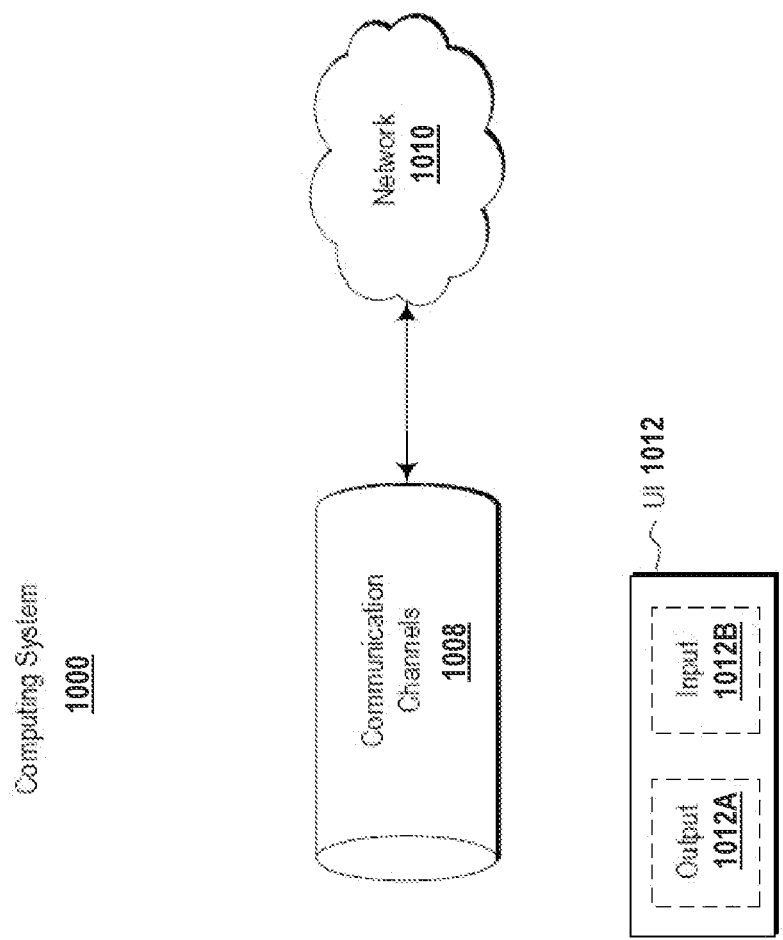
FIG. 10 illustrates an example computer system in which the principles described herein may be employed.
Figure 10:
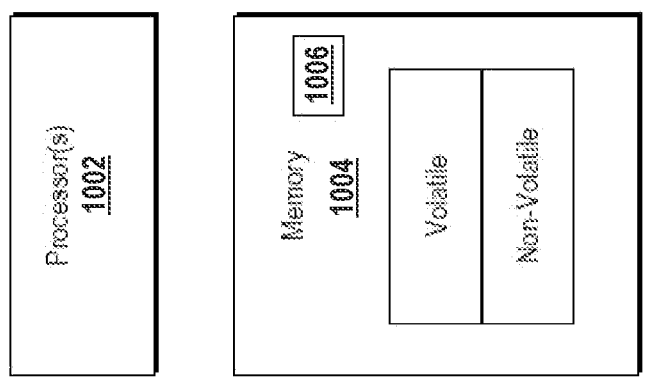

As illustrated in FIG. 10, in its most basic configuration, a computer system 1000 typically includes at least one hardware processing unit 1002 and memory 1004. The processing unit 1002 may include a general-purpose processor and may also include a field-programmable gate array (FPGA), an application-specific integrated circuit (ASIC), or any other specialized circuit. The memory 1004 may be physical system memory, which may be volatile, non-volatile, or some combination of the two. The term "memory" may also be used herein to refer to non-volatile mass storage such as physical storage media. If the computer system is distributed, the processing, memory and/or storage capability may be distributed as well.

The computer system 1000 also has thereon multiple structures often referred to as an "executable component". For instance, memory 1004 of the computer system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computer system, whether such an executable component exists in the heap of a computer system, or whether the executable component exists on computer-readable storage media.

In such a case, one of ordinary skill in the art will recognize that the structure of the executable component exists on a computer-readable medium such that, when interpreted by one or more processors of a computer system (e.g., by a processor thread), the computer system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computer systems. If such acts are implemented in software, one or more processors (of the associated computer system that performs the act) direct the operation of the computer system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1004 of the computer system 1000. Computer system 1000 may also contain communication channels 1008 that allow the computer system 1000 to communicate with other computer systems over, for example, network 1010.

While not all computer systems require a user interface, in some embodiments, the computer system 1000 includes a user interface system 1012 for use in interfacing with a user. The user interface system 1012 may include output mechanisms 1012A as well as input mechanisms 1012B. The principles described herein are not limited to the precise output mechanisms 1012A or input mechanisms 1012B; as such will depend on the nature of the device. However, output mechanisms 1012A might include, for instance, speakers, displays, tactile output, holograms, and so forth. Examples of input mechanisms 1012B might include, for instance, microphones, touchscreens, holograms, cameras, keyboards, mouse or other pointer input, sensors of any type, and so forth.

Embodiments described herein may comprise or utilize a special purpose or general-purpose computer system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computer system.

A "network" is defined as one or more data links that enable the transport of electronic data between computer systems and/or modules and/or other electronic devices. When information is transferred or provided over a network or another communications connection (either hard-wired, wireless, or a combination of hard-wired or wireless) to a computer system, the computer system properly views the connection as a transmission medium. Transmissions media can include a network and/or data links that can be used to carry desired program code means in the form of computer-executable instructions or data structures and which can be accessed by a general-purpose or special-purpose computer system. Combinations of the above should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile storage media at a computer system. Thus, it should be understood that storage media can be included in computer system components that also (or even primarily) utilize transmission media.

Computer-executable instructions comprise, for example, instructions and data which, when executed at a processor, cause a general-purpose computer system, special-purpose computer system, or special purpose processing device to perform a certain function or group of functions. Alternatively, or in addition, the computer-executable instructions may configure the computer system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computer systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The computer systems of the remaining figures (such as the head-mounted device 500 of FIG. 5) include various components or functional blocks that may implement the various embodiments disclosed herein, as have been explained. The various components or functional blocks may be implemented on a local computer system or may be implemented on a distributed computer system that includes elements resident in the cloud or that implement aspect of cloud computing. The various components or functional blocks may be implemented as software, hardware, or a combination of software and hardware. The computer systems of the remaining figures may include more or less than the components illustrated in the figures, and some of the components may be combined as circumstances warrant. Although not necessarily illustrated, the various components of the computer systems may access and/or utilize a processor and memory, such as processing unit 1002 and memory 1004, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A self-correcting projection system, comprising:
    an illumination light source configured to emit an illumination light beam;
    a monitor light source configured to emit a monitor light beam;
    a projector which receives the illumination light beam from the illumination light source and receives the monitor light beam from the monitor light source, the projector including a reflective spatial light modulator configured to modulate the illumination light beam and the monitor light beam to generate a projected combined light beam that contains a projected illumination light beam and a projected monitor light beam;

a display beam path configured to propagate a first portion of the projected combined light beam in a first direction toward an eye of a user, the first portion of the projected combined light beam containing at least a portion of the illumination light beam projected and modulated by the projector, and causing the eye of the user to see a display image corresponding to the modulated illumination light beam;

a monitor beam path configured to propagate a second portion of the projected combined light beam in a second direction toward a monitor camera, the second portion of the projected combined light beam containing at least a portion of the monitor light beam projected by the projector;

the monitor camera configured to receive the second portion of the projected combined light beam and capture a monitor image corresponding to the monitor light beam projected by the projector;

one or more processors; and one or more computer-readable media having stored thereon computer-executable instructions that, when executed by the one or more processors, cause the projection system to perform at least:

analyze the monitor image to determine an orientation or a position of the monitor image; and in response to determining that the monitor image is not properly oriented or positioned,
(1) adjust an orientation or a position of the projector, or
(2) adjust an orientation or a position of the illumination image.

2. The projection system of claim 1, wherein:
the monitor light beam is modulated by the reflective spatial light modulator of the projector before being propagated over the monitor beam path to generate the monitor image, and
the monitor camera includes a lensless camera, an angular sensitive pixel detector, or a quadrant diode detector.

3. The projection system of claim 1, wherein:
the monitor light beam is not modulated by the reflective spatial light modulator of the projector before being propagated over the monitor beam path to generate the monitor image, and
the monitor camera includes a quadrant diode detector, a camera, or a lensless camera.

4. The projection system of claim 1, wherein:
the illumination light source and the monitor light source are configured to emit the illumination light beam and the monitor light beam in different directions that intersect each other;
the projection system further includes a beam combiner configured to combine the illumination light beam and the monitor light beam into a combined light beam directed at the projector; and
the projector is configured to project the combined light beam into the projected combined light beam.

5. The projection system of claim 1, wherein the monitor image includes a predetermined set of dots or lines.

6. The projection system of claim 5, wherein the monitor image is compared with a boresight of the monitor camera to determine the orientation of the projected image.

7. The projection system of claim 1, wherein the illumination light source is configured to emit light beams in a first wavelength band, and the monitor light source is configured to emit light beams in a second wavelength band that is different from the first wavelength band.

8. The projection system of claim 7, wherein:
the illumination light source is a red-green-blue (RGB) light source configured to emit a red light beam, a green light beam, a blue light beam, or a combination thereof, and
the monitor light source is an invisible light source configured to emit an invisible light beam that is invisible to human eyes but detectable by the monitor camera.

9. The projection system of claim 7, wherein the display beam path is configured to propagate light beams in the first wavelength band, and the monitor beam path is configured to propagate light beams in the second wavelength band.

10. The projection system of claim 7, wherein the display beam path further includes a display filter configured to filter out light beam in the second wavelength band.

11. The projection system of claim 7, wherein the monitor beam path further includes a monitor filter configured to filter out light beam in the first wavelength band.

12. The projection system of claim 7, wherein the monitor light source includes one or more edge emitter laser diode or vertical-cavity surface-emitting laser diode configured to emit a laser light in the second wavelength band that is narrower than the first wavelength band.

13. The projection system of claim 12, wherein a power of the monitor light beam is greater than a power of the illumination light beam, such that the monitor image captured by the monitor camera has a sufficient signal-to-noise ratio to allow identification of the monitor image.

14. The projection system of claim 12, wherein the monitor camera is disposed near a nose bridge of the user, such that the user cannot see the monitor camera, the first monitor image, or the second monitor image.

15. The projection system of claim 1, wherein:
the projector is a first projector;
the illumination light source is a first illumination light source;
the monitor light source is a first monitor light source;
the display beam path is a first display beam path;
the monitor beam path is a first monitor beam path;
the monitor image is a first monitor image;
the projection system further comprises a second projector, a second illumination light source, a second monitor light source, a second display beam path, and a second monitor beam path;
the second illumination light source is configured to emit a second illumination light beam;
the second monitor light source is configured to emit a second monitor light beam;
the second projector is configured to project both the second illumination light beam and the second monitor light beam into a second projected combined light beam;
the second display beam path is configured to propagate a third portion of the second projected combined light beam in a third direction, the third portion of the second projected combined light beam containing at least a portion of the second illumination light beam projected by the second projector, causing a second eye of the user to see a second display image corresponding to the second illumination light beam;
the second monitor beam path is configured to propagate a fourth portion of the second projected combined light beam in a fourth direction, the fourth portion of the second projected combined light beam containing at least a portion of the second monitor light beam projected by the second projector;
the monitor camera is configured to receive the fourth portion of the second projected combined light beam and capture a second monitor image corresponding to the second monitor light beam projected by the second projector; and
the projection system is also configured to:
   analyze the second monitor image to determine an orientation or a position of the monitor image; and
   in response to determining that the second projector is not positioned properly, (1) adjust an orientation or a position of the second projector, or (2) adjust an orientation or a position of the second illumination image.

16. The projection system of claim 15, further configured to:
compare the first monitor image and the second monitor image to determine whether relative boresight to two eyes is aligned; and
in response to determining that relative boresight to two eyes is not aligned, or to adjust the relative boresight; adjust an orientation or a position of at least one of the first projector or the second projector.

17. A method implemented at a self-correcting projection system for monitoring or adjusting positions or orientations of a projector installed thereon, the method comprising:
emitting an illumination light beam from an illumination light source;
emitting a monitor light beam from a monitor light source;
receiving at the projector the illumination light beam from the illumination light source and the monitor light beam from the monitor light source, the projector including a reflective spatial light modulator configured to modulate the illumination light beam and the monitor light beam to generate a projected combined light beam that contains a projected illumination light beam and a projected monitor light beam;
projecting, by the projector, the illumination light beam into a projected illumination light beam;
projecting, by the projector, the monitor light beam into a monitor light beam;
propagating the projected illumination light beam over a first beam path in a first direction toward an eye of a user;
propagating the projected monitor light beam over a second beam path toward a second direction toward a monitor camera;
capturing, by the monitor camera, a monitor image corresponding to the monitor light beam;
analyzing the monitor image to determine an orientation or a position of the monitor image; and
in response to determining that the monitor image is not properly oriented or positioned,
   (1) adjust an orientation or a position of the projector, or
   (2) adjust an orientation or a position of the illumination image.

18. The method of claim 17, wherein:
the projector is a first projector;
the illumination light source is a first illumination light source;
the monitor light source is a first monitor light source;
the monitor image is a first monitor image;
the projection system further includes a second illumination light source, a second monitor light source, and a second projector; and
the method further comprises:
   emitting a second illumination light beam from the second illumination light source;
   emitting a second monitor light beam from the second monitor light source;
   projecting the second illumination light beam into a second projected illumination light beam;
   projecting the second monitor light beam into a second projected monitor light beam;
   propagating the second projected illumination light beam at a third direction toward a second eye of the user;
   propagating the second monitor light beam at a fourth direction toward the monitor camera;
   capturing, by the monitor camera, a second monitor image corresponding to the second monitor light beam;
   analyzing the second monitor image to determine an orientation or a position of the second monitor image; and
   in response to determining that the second projector is not properly oriented or positioned, (1) adjusting an orientation or a position of the second projector, or (2) adjusting an orientation or a position of the illumination image.

19. The method of claim 18, further comprising:
comparing the first monitor image and the second monitor image to determine whether relative boresight to two eyes is aligned; and
in response to determining that relative boresight to two eyes is not aligned, adjusting an orientation or a position of at least one of the first projector or second projector.

20. A head-mounted device, comprising:
a first projection system configured to project a first image at a first eye of a user, the first projection system comprising:
   a first illumination light source configured to emit a first illumination light beam;
   a first monitor light source configured to emit a first monitor light beam;
   a first projector configured to receive the first illumination light beam from the first illumination light source and receive the first monitor light beam from the first monitor light source, the first projector including a reflective spatial light modulator configured to modulate the first illumination light beam and the first monitor light beam to generate a first projected combined light beam that contains a projected first illumination light beam and a projected first monitor light beam,
   the first projector also configured to project both the first illumination light beam and the first monitor light beam into a first projected combined light beam;
   a first display beam path configured to propagate a first portion of the first projected combined light beam in a first direction, the first portion of the first projected combined light beam containing at least a portion of the first illumination light beam projected by the first projector, causing the first eye of the user to see a first display image corresponding to the first illumination light beam; and a first monitor beam path configured to propagate a second portion of the first projected combined light beam in a second direction, the second portion of the first projected combined light beam containing at least a portion of the first monitor light beam projected by the first projector;

a second projection system configured to project a second image at a second eye of the user, the second projection system comprising:

a second illumination light source configured to emit a second illumination light beam;

a second monitor light source configured to emit a second monitor light beam;

a second projector configured to receive the second illumination light beam from the second illumination light source and receive the second monitor light beam from the second monitor light source, the first projector including a reflective spatial light modulator configured to modulate the second illumination light beam and the second monitor light beam to generate a second projected combined light beam that contains a projected second illumination light beam and a projected second monitor light beam, the second projector also configured to project both the second illumination light beam and the second monitor light beam into a second projected combined light beam;

a second display beam path configured to propagate a third portion of the second projected combined light beam in a third direction, the third portion of the second projected combined light beam containing at least a portion of the second illumination light beam projected by the second projector, causing the second eye of the user to see a second display image corresponding to the second illumination light beam; and a second monitor beam path configured to propagate a fourth portion of the second projected combined light beam in a fourth direction, the fourth portion of the second projected combined light beam containing at least a portion of the second monitor light beam projected by the second projector;

a monitor camera configured to:
  receive the second portion of the first projected combined light beam to capture a first monitor image corresponding to the first monitor light beam projected by the first projector; and
  receive the fourth portion of the second projected combined light beam to capture a second monitor image corresponding to the second monitor light beam projected by the second projector;

one or more processors; and one or more computer-readable media having stored thereon computer-executable instructions that are structured such that, when the computer-executable instructions are executed by the one or more processors, the head-mounted device is configured to perform at least:
  analyze the first monitor image or the second monitor image to determine an orientation or a position of the first monitor image or the second monitor image; and
  in response to determining that at least one of the first monitor image or the second monitor image is not properly oriented or positioned,
  (1) adjust an orientation or a position of at least one of the first projector or the second projector, or
  (2) adjust an orientation or a position of at least one of the first illumination image or the second illumination image.

\* \* \* \* \*